United States Patent

Jones et al.

[11] 3,923,012
[45] Dec. 2, 1975

[54] STRATIFIED CHARGE ROTARY ENGINE WITH HIGH AND LOW PRESSURE FUEL SUPPLY

[75] Inventors: Charles Jones, Hillsdale; Harold D. Lamping, Oakland; David M. Myers, Upper Saddle River, all of N.J.

[73] Assignee: Curtiss-Wright Corporation, Wood-Ridge, N.J.

[22] Filed: Dec. 12, 1973

[21] Appl. No.: 423,920

[52] U.S. Cl. ............................................. 123/8.09
[51] Int. Cl.² .......................................... F02B 53/10
[58] Field of Search..... 123/8.09, 8.11, 8.13, 32 ST, 123/32 G, 32 SW

[56] References Cited
UNITED STATES PATENTS

| | | | |
|---|---|---|---|
| 2,803,230 | 8/1957 | Bensinger | 123/32 ST |
| 3,246,636 | 4/1966 | Bentele | 123/8.09 |
| 3,508,530 | 4/1970 | Clawson | 123/8.09 X |
| 3,659,564 | 5/1972 | Suzuki et al | 123/32 ST X |
| 3,814,067 | 6/1974 | Fuente | 123/32 ST |

FOREIGN PATENTS OR APPLICATIONS

| | | | |
|---|---|---|---|
| 893,789 | 4/1962 | United Kingdom | 123/8.11 |
| 1,027,787 | 4/1966 | United Kingdom | 123/8.09 |

Primary Examiner—C. J. Husar
Assistant Examiner—Michael Koczo, Jr.
Attorney, Agent, or Firm—Arthur Frederick; Victor D. Behn

[57] ABSTRACT

A rotary combustion engine designed for operation as a stratified charge engine in which the fuel-air mixture supplied to the engine working chambers during their intake phase is very lean. Additional fuel is injected into the working chambers after there has been substantial compression of the initial lean mixture, the additional fuel being ignited as it is injected into the engine working chambers and the resulting combustion of this additional fuel is effective to ignite said lean combustion mixture.

3 Claims, 3 Drawing Figures

STRATIFIED CHARGE ROTARY ENGINE WITH HIGH AND LOW PRESSURE FUEL SUPPLY

BACKGROUND OF THE INVENTION

The invention relates to rotary internal combustion engines of the type disclosed in prior U.S. Pat. No. 2,988,065 and particularly to such an engine designed for operation as a stratified charge engine. Prior stratified charge rotary combustion engines are disclosed in U.S. Pat. Nos. 3,246,636, 3,508,530 and 3,698,364.

The problem of pollution resulting from the exhaust emissions discharged by internal combustion engines is well recognized today. One of the approaches for minimizing this problem is to design the engine for operation with a stratified charge. By stratified charge operation is meant that the fuel-air mixture or charge in each engine combustion chamber is not a uniform mixture and instead has at least one region where the fuel-air mixture is relatively rich. Combustion is initiated in this relatively fuel-rich mixture and this combustion is relied upon to ignite the fuel in the relatively fuel-lean region. Such use of a stratified charge type of cycle has the beneficial effect that the engine can be operated with a leaner over-all fuel-air ratio than is possible with an engine having a uniform fuel-air mixture. Compared to engine operation at approximately a stoichiometric fuel-air ratio, engine operation on a leaner fuel-air ratio not only results in a significant reduction of both the oxides of nitrogen (NOx) and carbon monoxide in the engine exhaust and generally in some reduction of the hydrocarbons and also results in a reduction in engine fuel consumption.

In a stoichiometric mixture of a gasoline fuel and air, the fuel-air ratio by weight is approximately 0.067. A charge having a fuel-air ratio of less than about 0.055 cannot be consistently ignited by a spark type igniter. Conventional non-stratified charge internal combustion engines, both of the rotary and reciprocating piston types, generally operate with a fuel-air ratio in the range of 0.06 to 0.09. A stratified charge rotary engine, however, of the configuration disclosed in the aforementioned U.S. Pat. Nos. 3,246,636 and 3,698,364 has successfully operated at the extremely low over-all fuel-air ratio of approximately 0.015.

Difficulty, however, has been experienced in operating the rotary combustion engine configuration disclosed in U.S. Pat. Nos. 3,246,636 and 3,698,364 over the entire operating range with both completely acceptable firing regularity and good engine performance. As already noted, U.S. Pat. No. 3,508,530 also shows a stratified charge rotary engine. In this latter patent, as in the present invention, fuel is introduced into the engine during both the intake and compression phases of the cycle. This patent, however, discloses a pre-combustion chamber and therefore scavenging this pre-combustion chamber of burnt combustion gases is a problem. Also such a pre-combustion chamber has a substantial volume and therefore significantly reduces the engine compression ratio.

SUMMARY OF THE INVENTION

Accordingly, it is an object of this invention to provide a rotary combustion engine designed for operation on a new and improved stratified charge type of cycle so that the engine can be operated on a lean over-all fuel-air ratio throughout its operating range.

Another object of the invention is to provide a rotary combustion engine designed for stratified charge operation and a method of operating such an engine in which a portion of the fuel is supplied to each working chamber for mixture with the intake air during the intake phase of each chamber and the remaining portion of the fuel is injected into each working chamber during the latter portion of the compression phase of the initial fuel-air mixture, the additional fuel being ignited at its point of discharge and as it is being discharged into the chamber.

In accordance with the present invention, a portion of the fuel is introduced into each engine working chamber during its intake phase and additional fuel is injected into each chamber after substantial compression of the intake charge and just prior to combustion whereby no pre-combustion chamber, such as shown in aforementioned prior U.S. Pat. No. 3,508,530 is required. This additional fuel is ignited close to its point of injection as it discharges into a working chamber in a manner similar to the fuel discharge and ignition described in said aforementioned prior U.S. Pat. Nos. 3,246,636 and 3,698,364. The flame produced by burning the initial portion of this additional fuel as it is introduced into the working chamber not only is effective to ingite the remainder of this additional fuel but also is effective to ignite the fuel in the original lean fuel mixture introduced into the chamber thereby making it possible to operate the engine on a relatively lean over-all fuel-air ratio. Inasmuch as only a portion of the total quantity of fuel for each working chamber is injected into the chamber in the combustion region, as compared to said two prior patents (U.S. Pat. Nos. 3,246,636 and 3,698,364) in which the entire portion of fuel is so injected, the aforementioned operating difficulties encountered with engines of the configuration of said prior patents, are minimized.

A rotary combustion engine having the foregoing configuration may be operated in a number of ways. (1) For example, the carburetor may be designed to maintain a constant fuel-air ratio of the mixture supplied through the intake passage, with this ratio being too lean for ignition by a spark-type igniter and with the fuel supplied by the injection nozzle being varied to regulate the engine power output. (2) Instead, the carburetor may be designed to vary the fuel-air ratio of the mixture supplied to the intake passage over the operating range of the engine in such a manner that at very low loads this mixture has a fuel-air ratio such that it can be ignited by a spark-type igniter but at higher loads the fuel-air ratio of this mixture is too lean to be ignited by a spark plug. With this latter arrangement, all of the engine fuel may be supplied through the intake passage at low loads with the fuel injection nozzle supplying fuel only at the higher loads. Preferably, however, the fuel injection nozzle would supply fuel over the entire engine operating range.

A third possibility is to supply the fuel to the intake passage at a constant rate while the fuel supplied through the injection nozzle is varied to regulate the engine power output.

In a fourth and preferred arrangement, the fuel injection nozzle supplies a substantially constant quantity of fuel into each working chamber (regardless of engine power output or speed) while the carburetor is set to provide a lean fuel-air ratio too lean for spark plug ignition and also having a throttle valve to regulate the engine power output. This latter arrangement may utilize a conventional carburetor system to regulate the fuel flow and simplifies the fuel injection system by eliminating any need to vary the fuel injection. In lieu of a carburetor, a low pressure fuel injection system may be used to supply fuel into each working chamber during its intake phase in accordance with the engine power requirements. With this latter arrangement the air intake passage may be characterized by the absence of any throttle.

Other objects of the invention will become apparent upon reading the following detailed description in connection with the drawings.

DESCRIPTION OF PREFERRED EMBODIMENTS

Figure 1:
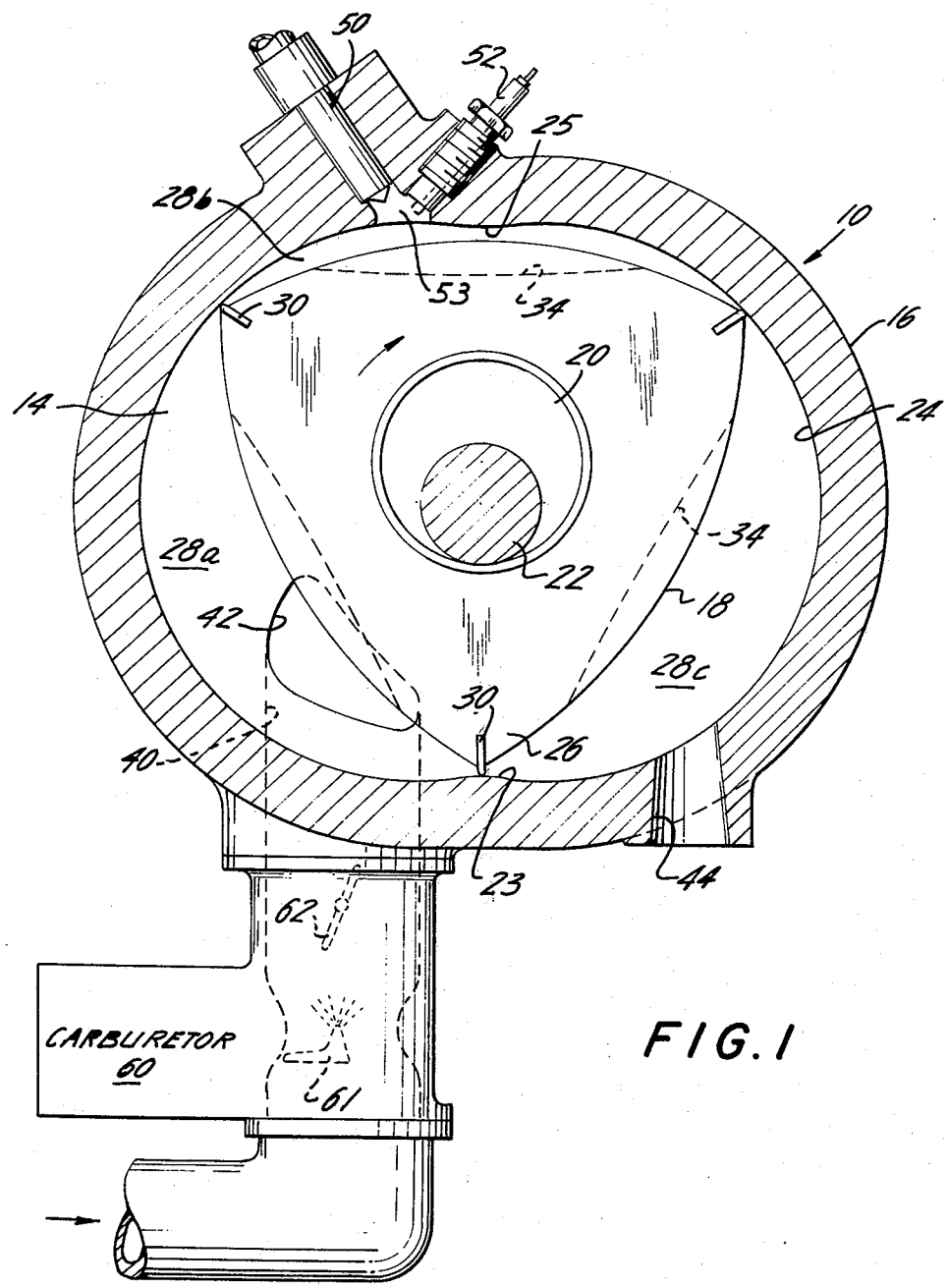
FIG. 1 is a schematic transverse sectional view illustrating a rotary combustion engine embodying the invention.

Referring to the drawing, particularly to FIG. 1, a rotating combustion engine is schematically indicated at 10, the engine being generally similar to the type disclosed in said aforementioned prior patents. The engine 10 comprises an outer body or housing consisting of two axially spaced end housings 14 (only one of which is shown in the drawings) and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings 14. The axis of the shaft 22 is perpendicular to the inner walls of said end housings 14.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 (separately identified by letters a, b and c) between the rotor and the housings 14 and 16. For this purpose, each of the rotor apex portions is provided with a seal 30 which extends across the rotor between the inner walls of the end housings 14 and the rotor also has suitable seals (not shown) on its end faces for sealing contact with said end housing inner walls. Each of the three peripheral surfaces of the rotor preferably is provided with a trough-like recess 34.

The engine 10 also includes suitable gearing (not illustrated) between the rotor 18 and the engine housing to control the relative rotation of the rotor, such gearing is conventional and preferably is similar to that illustrated in the aforementioned prior patents.

An air intake passage 40 supplies air to an air intake port 42 disposed adjacent to and at one side of the junction 23 of the two lobes of the trochoidal peripheral surface 24. Said passage 40 extends through the housing end wall 14 and the port 42 opens through the inner wall of this end housing 14. An exhaust port 44 is formed in the intermediate housing 16 adjacent to and on the opposite side of said junction 23. The engine combustion is initiated in the engine working chambers 28 in the vicinity of the other junction 25 of the two lobes of trochoidal surface 24.

The engine structure so far described is conventional and is generally similar to that illustrated in the aforementioned prior patents. Reference is made to said prior patents for further details of such an engine including, for example, details of the rotor seals and the gearing between the rotor and housing. With such an engine, during engine operation and with the rotor rotating clockwise as viewed in FIG. 1, the volume of each working chamber 28 periodically increases from a minimum volume condition, when it is located adjacent to the lobe junction 23 and opens the intake port 42, to a maximum volume condition and closes the intake port and then said chamber decreases in volume to compress its intake charge until the working chamber again reaches a minimum volume condition, but this time at the lobe junction 25. Thereafter, the volume of said chamber again increases to a maximum and then decreases to a minimum as the chamber comes into communication with the exhaust port at the lobe junction 23 to complete the cycle.

A fuel nozzle 50 is mounted on the intermediate housing 16 adjacent to the lobe junction 25. The fuel nozzle 50 has its fuel discharge end disposed close to the trochoidal surface 24 for discharging fuel into each working chamber 28 after the intake charge within the chamber has been substantially compressed and combustion is about to be initiated. Fuel is supplied to the nozzle 50 by any conventional fuel pump, for example, by a pump similar to that disclosed in aforementioned U.S. Pat. No. 3,246,636. The fuel nozzle 50 may discharge fuel into each working chamber in a showerhead-type of spray pattern as is disclosed in the aforementioned U.S. Pat. No. 3,698,364.

A spark plug-type igniter 52 is also mounted on the intermediate housing 16 adjacent to the lobe junction 25 and immediately adjacent to the fuel nozzle 50. The electrodes of the spark plug 52 preferably are disposed adjacent to and in a small common cavity 53 with the discharge end of the nozzle 50, with said cavity preferably opening unrestrictedly through the trochoidal surface 24. In addition, the fuel nozzle 50 and spark plug 52 are disposed so that at least a portion of the fuel spray vapor discharged from the nozzle 50 passes in close proximity to the spark plug electrodes immediately as the fuel leaves the nozzle 50 for ready ignition by said spark plug.

The ignition circuit for the spark plug 52 is arranged to fire the spark plug while fuel is discharging from the fuel nozzle 50 so that this fuel is ignited at the fuel nozzle 50 as it discharges from the nozzle and the burning of this initial portion of the fuel discharged from the nozzle 50 ignites the balance of the fuel discharging from said nozzle. The timing of the energization of the spark plug 52 is such that it fires during the period of fuel discharge from the nozzle 50 into a working chamber 28 and preferably during the initial portion of such discharge into each working chamber.

In general the physical arrangement and mode of operation of the fuel nozzle 50 and spark plug 52 preferably is similar to that disclosed in the aforementioned U.S. Pat. Nos. 3,246,636 and 3,698,364. In said prior patents all the fuel is supplied by the fuel discharge nozzle and only air is supplied through the engine intake port. With the present invention, however, a portion of the engine fuel is supplied to each working chamber 28 during its intake phase. Thus, in FIG. 1 the engine intake passage 40 is provided with a carburetor 60 having a fuel discharge pipe 61 for adding fuel to the air supplied to each working chamber 28 through the intake passage 40. The carburetor 60 is set so that a lean fuel-air mixture is supplied to each working chamber 28 through the intake passage 40. Preferably, the fuel-air ratio of this mixture is less than 0.055 and therefore is too lean for ignition by a conventional spark plug. The carburetor 60 includes the usual throttle valve 62 for regulating the quantity of air and fuel supplied to each working chamber 28 through the intake passage 40.

With the rotor 18 in the position illustrated in FIG. 1, the working chamber 28a is in its intake phase and a lean fuel-air mixture is being supplied to this chamber through the intake passage 40 and its port 42. As the rotor 18 rotates within the engine cavity, the volume of this chamber 28a reaches its maximum volume position and then the rotor is effective to close the intake port 42 and begins to decrease the volume of said chamber to compress its fuel-air charge.

Figure 2:
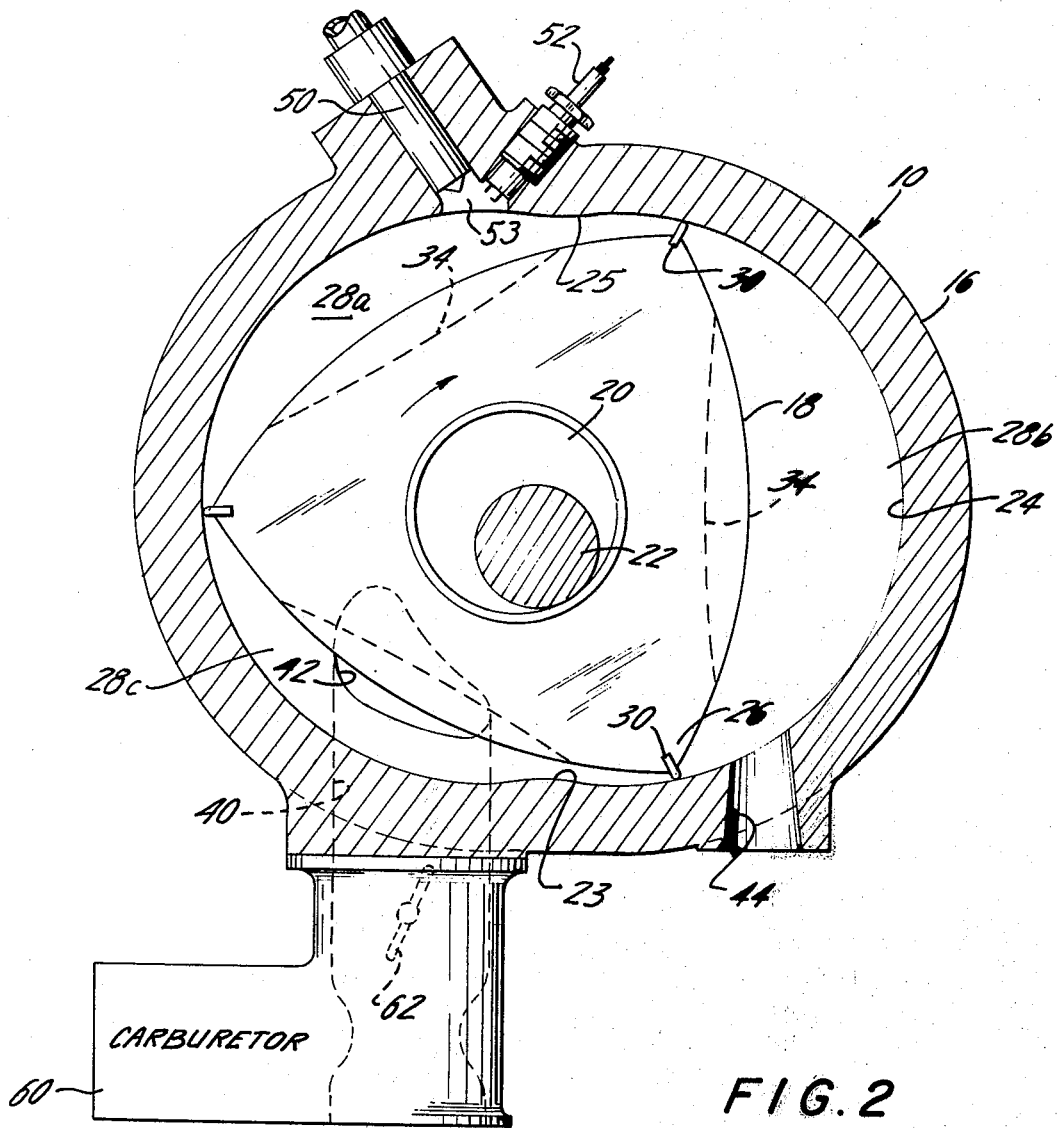
FIG. 2 is a view similar to FIG. 1 but illustrating the engine rotor in a different position.

When the rotor 18 reaches the position illustrated in FIG. 2, the fuel-air intake charge within the chamber 28a has been substantially compressed and this chamber is then short of its minimum volume position adjacent to the lobe junction 25. At this time, additional fuel is discharged into the working chamber 28a through the fuel nozzle 50. At substantially the same time the spark plug 52 is energized so as to ignite the fuel discharging from the fuel nozzle 50 at its point of discharge as the fuel discharges from said nozzle.

The burning of this initial fuel discharge from the nozzle 50 not only is effective to ignite the remainder of the fuel discharged from said nozzle but also is effective to ignite the original lean fuel-air intake charge supplied to the working chamber 28a by the intake passage 40. After combustion of the entire fuel charge in the chamber 28a has thus been initiated, the balance of expansion and exhaust phases of the cycle of this working chamber are completed substantially as described in the aforementioned prior patents. Each of the other working chambers 28b and 28c goes through the same cycle. With this arrangement, the spark plug 52 is effective to cause ignition of the charge in each working chamber 28 notwithstanding the fact that the overall fuel-air ratio in each working chamber 28 may be very lean.

In the aforementioned stratified charge rotary engine, U.S. Pat. Nos. 3,246,636 and 3,698,364, the entire engine fuel supply is discharged through the fuel injection nozzle corresponding to the nozzle 50 of the present invention. In the present invention, however, only a portion of the engine fuel is supplied through the nozzle 50 whereby the aforementioned operating difficulties of the rotary engines of said prior patents is minimized.

Preferably the fuel nozzle 50 supplies a constant quantity of fuel to each working chamber 28 regardless of the engine power output, the carburetor 60 and its throttle valve 62 serving to vary the engine fuel supply and therefore the engine power output in accordance with the engine load requirements. Such an arrangement utilizes a conventional carburetor-type fuel-air stream to vary the engine fuel supply and at the same time permits the use of a simple fuel injection system requiring no fuel regulation. That is, in such an arrangement the fuel pump supplying fuel to the nozzle 50 does not require variable means to regulate the fuel flow in accordance with engine power requirements, as for example, the means shown in prior U.S. Pat. No. 3,246,636 for varying the effective stroke of the fuel pump. As already indicated, in lieu of a constant fuel supply from the nozzle 50 to each working chamber 28, the fuel flow may be varied at the fuel nozzle 50 as well as at the carburetor 60.

In lieu of a carburetor, it is within the scope of the invention to supply the initial fuel to each working chamber during its intake phase by means of a low pressure fuel injection nozzle. Such a modification is illustrated in FIG. 3 in which the parts corresponding to the parts of FIG. 1 have been indicated by the same reference numerals.

Figure 3:
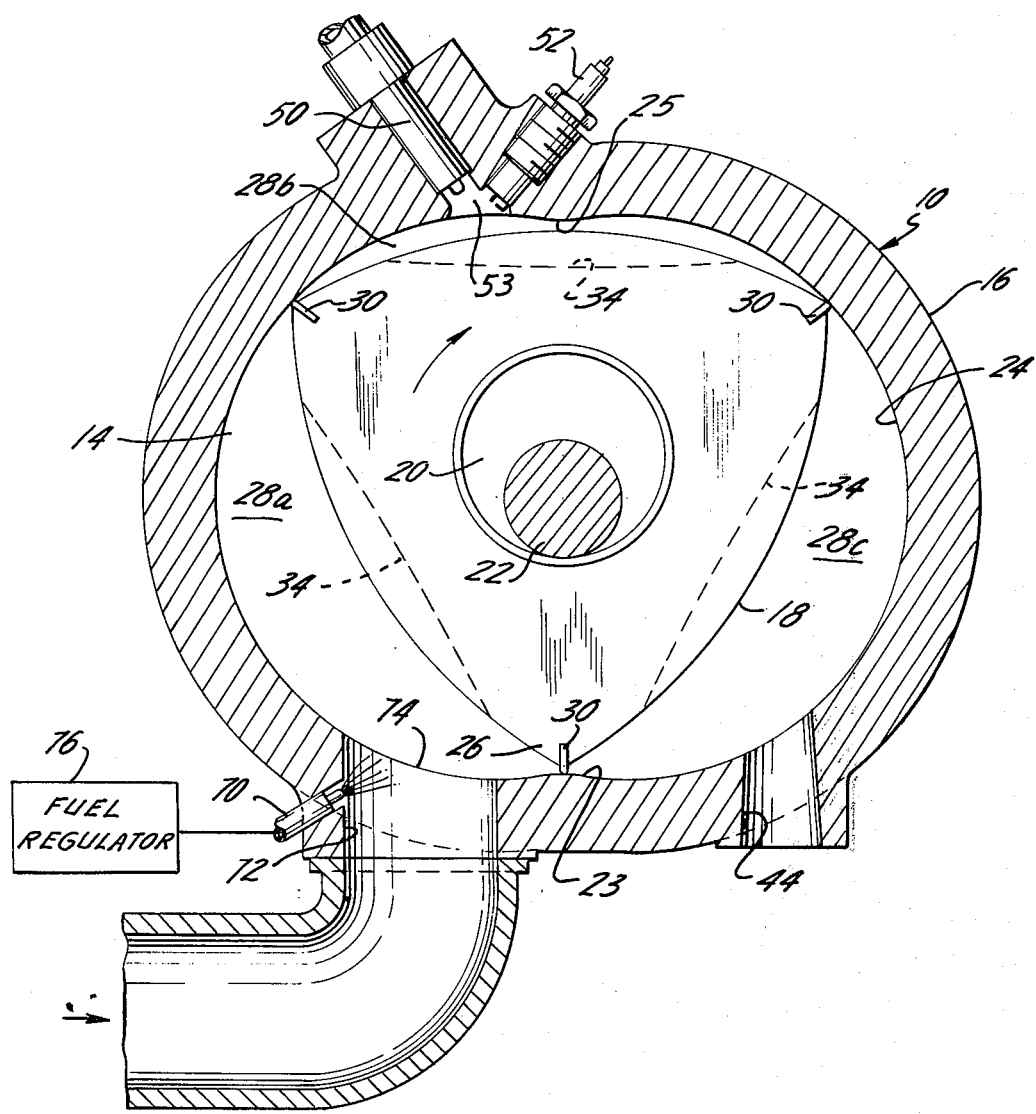
FIG. 3 is a schematic view similar to FIG. 1 but illustrating a modified form of the invention.

In FIG. 3 the carburetor 60 of FIG. 1 has been replaced by a low pressure fuel injection nozzle 70 discharging directly into the air intake passage 72 at a point adjacennt to the intake port 74 at the downstream end of said passage. Conventional means schematically indicated at 76 is provided to regulate the fuel flow from the nozzle 70 so as to regulate the engine power output. Also, in FIG. 3 unlike the intake passage 40 of FIG. 1, the intake passage 72 preferably is characterized by the absence of any throttle valve thereby eliminating the losses associated with such a valve. The intake passage 72 and its port 74 passes through the intermedate housing 16 rather than through an end housing 14 as does the passage 40 and intake port 42 of FIG. 1. Either of these two types of intake passage and port arrangements may be used in both the embodiments of FIGS. 1 and 3. Also the low pressure fuel injection nozzle 70 may, if desired, discharge directly into a working chamber 28 through the trochoidal surface 24 at a point adjacent to the intake port 74 rather than into the intake passage 72 as illustrated. The rotary engine of FIG. 3 is otherwise identical to that of FIG. 1.

As in the modification of FIG. 1, in FIG. 3 the engine fuel supply to each working chamber 28 during its intake phase is such as to provide a lean fuel-air ratio for the intake charge within each working chamber 28 and preferably this charge is too lean for ignition by a spark plug-type igniter. Also, as in FIG. 1, additional fuel is supplied to each working chamber by the fuel nozzle 50, this additional fuel being ignited by the spark plug 52. It is apparent, therefore, that the rotary engine of FIG. 3 operates essentially in the same manner as that described in FIG. 1.

When a low pressure fuel injection nozzle, such as the nozzle 70 in FIG. 3, is used in lieu of a carburetor, it is possible to time the fuel injection from the nozzle so that the fuel flow from the nozzle is intermittent and not continuous as in the case of a carburetor. That is, the fuel could be supplied from the nozzle 70 into each working chamber during only a portion of the time that each chamber was in communication with the nozzle. In this way it is possible, if desired, to achieve stratification in each working chamber of the fuel discharged from the nozzle 70.

The invention is clearly not limited to the specific rotary engine configuration illustrated. For example, the trochoidal surface 24 could have more than two lobes with a number of apex portions 26 on the rotor being correspondingly increased. Such rotary engine variations are fully described in the aforementioned U.S. Pat. No. 2,988,065.

It should be understood that this invention is not limited to the specific details of construction and arrangement thereof herein illustrated and that changes and modifications may occur to one skilled in the art without departing from the spirit or scope of the invention.

What is claimed is:

1. A rotary combustion engine comprising:
    a. an outer body having an internal cavity, the peripheral surface of which has a multi-lobe profile and also having an air intake passage and a combustion gas exhaust passage;
    b. an inner body of generally polygonal profile, mounted for relative rotation within said outer body, the apex portions of said inner body having sealing cooperation with said peripheral surface to define a plurality of working chambers between said peripheral surface which vary in volume in response to said relative rotation;
    c. means for supplying fuel to each working chamber as said chamber is expanding in its intake phase for mixture with air entering through said intake passage to form an initial fuel-air mixture having a fuel-air ratio less than that of a stoichiometric mixture, said fuel supplying means including means operative over substantially the entire operating range of the engine for varying the quantity of fuel supplied to each engine working chamber during its intake phase so as to regulate the engine power output;
    d. a fuel nozzle mounted on said outer body adjacent to a lobe junction of said multi-lobe peripheral surface with its discharge end disposed close to said peripheral surface for discharging a substantially constant quantity of additional fuel directly into each working chamber through a recess in said peripheral surface of the outer body having unrestricted communication with each working chamber, said additional fuel being discharged into each working chamber after the initial fuel-air mixture in said chamber has been substantially compressed and is ready for combustion; and
    e. spark plug type ignition means mounted on said outer body with its electrodes disposed in said recess adjacent to the discharge end of said fuel nozzle and operative to ignite fuel as it discharges from said nozzle into the adjacent working chamber whereby the burning of said additional fuel is effective to ignite the initial fuel-air mixture in said working chamber.

2. A rotary combustion engine as claimed in claim 1 and in which said means for supplying fuel includes a carburetor for said intake passage for supplying fuel to said passage to form said initial fuel-air mixture.

3. A rotary combustion engine as claimed in claim 1 and in which said means for supplying fuel includes a second fuel nozzle for supplying the fuel to each chamber during its intake phase to form said initial fuel-air mixture and further in which said intake passage is characterized by the absence of any throttle valve.

* * * * *